United States Patent
Novak

[15] 3,655,058
[45] Apr. 11, 1972

[54] FILTRATION APPARATUS
[72] Inventor: Richard A. Novak, 20 Chestnut Street, Boston, Mass. 02108
[22] Filed: July 13, 1970
[21] Appl. No.: 54,507

[52] U.S. Cl. ............................................210/360, 210/380
[51] Int. Cl. .......................................................B04b 5/12
[58] Field of Search ...........................210/210–217, 354, 210/380, 360, 360 A; 55/400; 233/2

[56] References Cited

FOREIGN PATENTS OR APPLICATIONS 1,221,616  1/1960  France................................210/360

Primary Examiner—J. L. DeCesare
Attorney—Sewall P. Bronstein and Donald Brown

[57] ABSTRACT

A filtration apparatus which includes a rotating filter, a compressor or blower for providing a positive fluid flow to the rotating filter, and an expander or turbine for extracting energy from the fluid after it has been filtered.

10 Claims, 5 Drawing Figures

INVENTOR
RICHARD A. NOVAK
BY
Llike, Thompson, & Bronstein
ATTORNEYS

FILTRATION APPARATUS

This invention relates to an apparatus for removing particulate matter from a fluid, be it a liquid or gas. The particulate matter can be solid particles; in a case of a gaseous fluid, particles can be solid or liquid, as for example oil.

Over the years many types of automatic filtration apparatus have been developed for removing particulate matter from fluids. The types of filters and filtration apparatus have included static filters, that is those where a filter material is provided in the path of the fluid to be cleaned and in which the fluid medium is passed therethrough. In addition, devices such as scrubbers and centrifuge type devices relying on the centrifuge principle have also found wide acceptance. In all of these devices the cost of operation, ease of maintainance and efficiency are all important considerations.

The present invention basically relies upon centrifugal motion and includes means to provide a positive and controlled fluid flow through the filtering medium of the device.

The fluid to be passed through the filtering medium is initially imparted with a high component of circumferential velocity so that the fluid is first whirled or swirled to remove large heavy particles from the fluid prior to the remainder of the fluid carrying other smaller or lighter particles impinging upon the filtering medium.

In addition, the efficiency of the filtration apparatus of this invention is significantly improved by the use of a turbine or discharge vane system which is adapted to recover the energy (predominately rotational) remaining in the moving fluid as it is being discharged from the filtration apparatus.

The filtration apparatus of this invention also includes a number of elements or deflecting devices to control the pressure drop within the system and the flow of the fluid through the system so as to maximize the efficiency of the filtration apparatus.

In view of the above it is an object of this present invention to provide a new and improved filtration apparatus that not only provided high efficiency but which is also relatively maintainance free.

A further object of this invention is to provide a new and improved filtration apparatus which is adapted to remove particulate matter from either a liquid or a gas and which includes means for extracting energy remaining in the filtered media.

A further object of this invention is to provide a new and improved filtration apparatus which is particularly adaptable for removing oil and other contaminants found in air in a highly efficient manner.

Further objects and advantages of the invention will in part be obvious and will in part be apparent from the specification.

The invention accordingly comprises the features of construction, combinations of elements and arrangement of parts will be exemplified in the constructions hereinafter set forth. The scope of the invention will be indicated in the claims. For a fuller understanding of the character and the objects of the invention reference is had to the following description taken in connection with the accompanying drawings in which:

Figure 1:
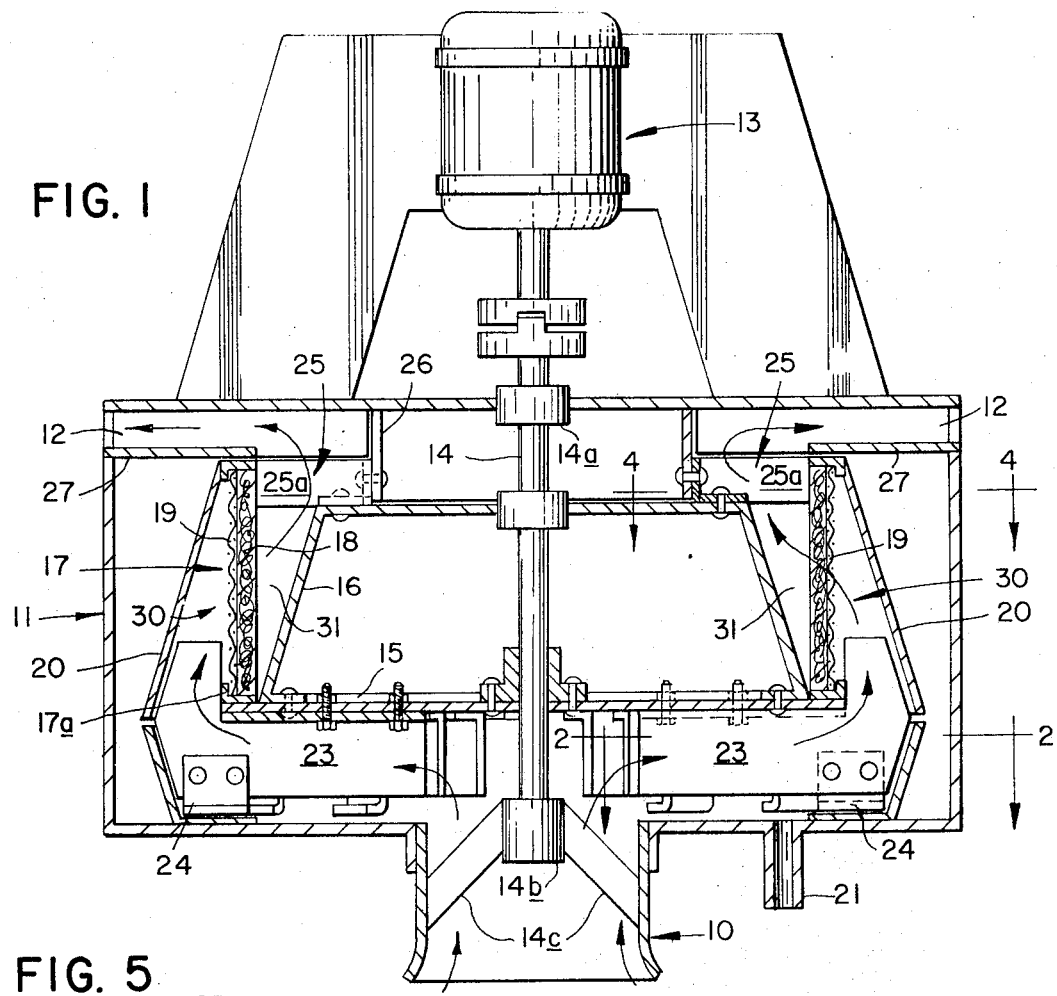
FIG. 1 is a side elevational view partially in cross section of the filtration apparatus constructed in accordance with the invention.

Reference should now be had to FIGS. 1 through 4 for a description of the preferred embodiment of the invention. This apparatus shown in FIGS. 1 to 4 is particularly adapted to the filtration of particle ladened gas as for example, gas ladened with dirt, e.g., metal particles or oil, etc.

The device shown in FIGS. 1 through 4 is adapted (though not limited) to be hung from a ceiling over a machine tool or the like. It is described as though for shaft vertical installation, it could as well be shaft horizontal. It is adapted, when positioned in this manner, to cleanse the air in the vicinity of the machine tool. As is well known many machine tools utilize cooling oil or other liquids in performing their function. Accordingly, it is highly desirable that means be provided to remove oil particles from the air to avoid machine shop pollution. Similarly, in printing establishments a mist of ink is sprayed into the atmosphere. This becomes toxic in heavy concentrations, and must be removed.

The apparatus of this invention is also adapted to many other uses, as for example in the removal of grease in kitchens, and fibre glass dust from factory environments and other places where air is required to be filtered.

The particle or oil ladened air is permitted to enter into the filtration apparatus through an inlet shown at 10 and which is shown as having a bell shaped bottom. In many applications of the device, the particle or oil laden air will be drawn from ducts which collect the air in hoods adjacent to where the prevention occurs. The inlet 10 is coupled to a housing 11 preferably cylindrically shaped and having one or more outlet ports shown at 12 positioned about the top thereof. The housing is essentially a pressure tight stationary housing except for the inlet and outlets therefrom.

In order to drive the rotating elements of the apparatus, there is provided an electric motor or other drive means 13 which is coupled to a drive shaft 14. The drive shaft 14 rotates in bearing 14a and is supported by bearing 14b. The bearing 14b is supported by members 14c coupled to the member 10.

Coupled to and journaled to the shaft 14 for motion therewith is a plate 15 on which there is mounted a cylindrical member 16 preferably in the shape of a cone and preferably of solid material. The cone 16 essentially has its outer wall positioned so as to deflect the fluid medium out of the housing after it has been filtered. Also coupled to the plate and supported thereby is a cylindrical filter 17, which comprises a frame shown at 17a for supporting a layer of filter material 18 such as polyurethane foam, asbestos fiber or the like and which has positioned along its outer surface a metallic screen 19 (e.g., a ½-inch mesh screen).

In the preferred form of this invention there is provided a rotating cone 20 supported by the frame 17 and adapted to rotate with the cone 16 and the frame 17. The inner wall of the cone 20 is adapted to deflect the fluid medium in the housing onto the screen as well as to provide means for permitting the particles centrifuged or whirled away from the screen 19 to impinge thereon and be deflected downward to the bottom of the housing such that the particles can be expelled through one or more ports in the bottom of the housing shown at 21.

In order to force the fluid medium and the particles onto the filter there is provided a compressor or blower which is adapted to feed fluid into the region between the inner wall of the cone 20 and the filter screen 19 at a pressure higher than the pressure of the fluid being fed into the inlet 10 of the apparatus. The compressor comprises a plurality of fins (see FIG. 2) shown at 23 which are coupled, e.g. by bolts, to the plate 15 and are adapted to rotate therewith. In the most preferred form, the blades or vanes 23 are provided with tabs or vane extensions shown at 24 (see FIG. 3) which are coupled thereto and which extend below the surface of the bottom portion of the vane 23.

These bent or twisted tabs or vane extensions introduce additional pre-swirl or counter-swirl of the fluid medium relative to the rotating filter screen 19 as well as relative to the filter material 18. The swirling of the fluid medium aids in the separation of particles by centrifugal force prior to the particle ladened fluid (e.g. air and oil) impinging on the filter material 18. The adjustable tabs or vane extensions also provide control of the "angle of attack" of the fluid with respect to the interstices of the filtration media. After the air passes through the filter screen 19 and the filter material 18, it is deflected upwardly into an expander or turbine 25 comprising a plurality of fins or vanes 25a coupled to the topmost portion of the cone 16.

In addition, coupled to the expander 25, there is provided a cylindrical deflector 26 for deflecting air out of the housing through the outlet 12. In the topmost portion of the housing there is provided a sealing member 27 having a center opening but connected to the side wall of the housing for preventing air from bypassing the screen and flowing out of the outlet 12.

In operation, air is permitted to pass into the apparatus as shown by the arrow at the inlet 10 and enters the radial compressor comprising vanes 23 and van extensions 24. At the discharge of the compressor or blower the air passes into the rotating volume 30.

The compressor element which is shown as being predominately radial can also be an axial compressor or mixed flow compressor as long as it imparts a high component of circumferential velocity to the body of fluid (air); the circumferential component of velocity of the air is retained in the volume between the rotating cone 20 and the rotating filter comprising the screen 18 and the filter material 17.

Figure 5:
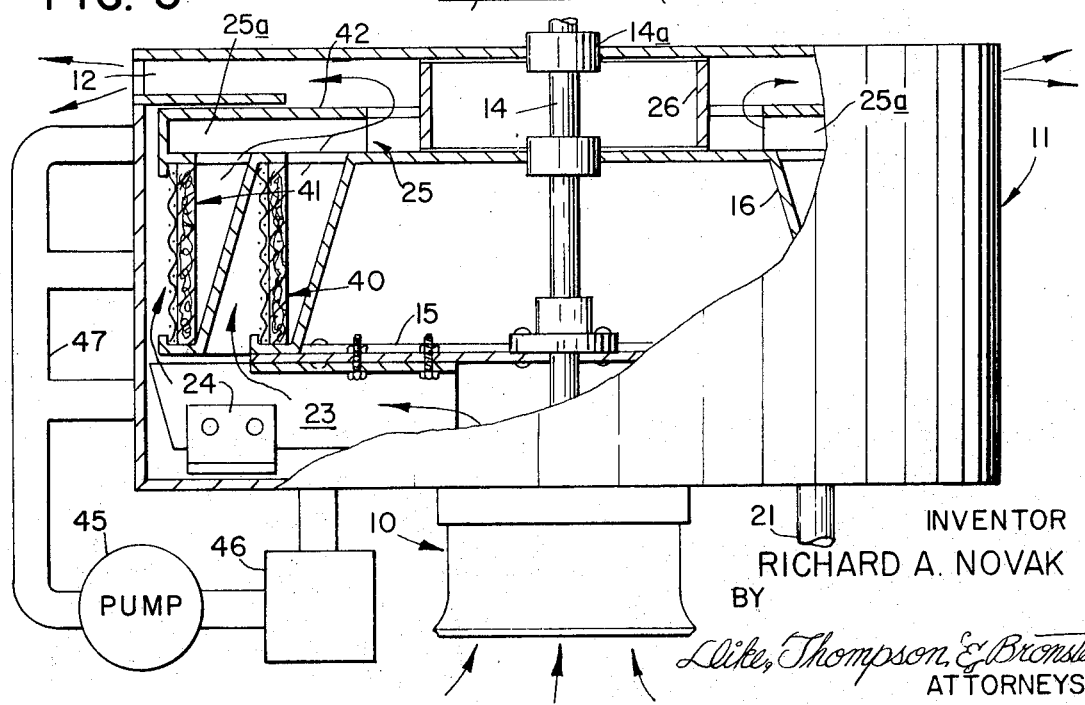
FIG. 5 is a cross section of a fragmentary portion of a modification of this invention.
Figure 2:
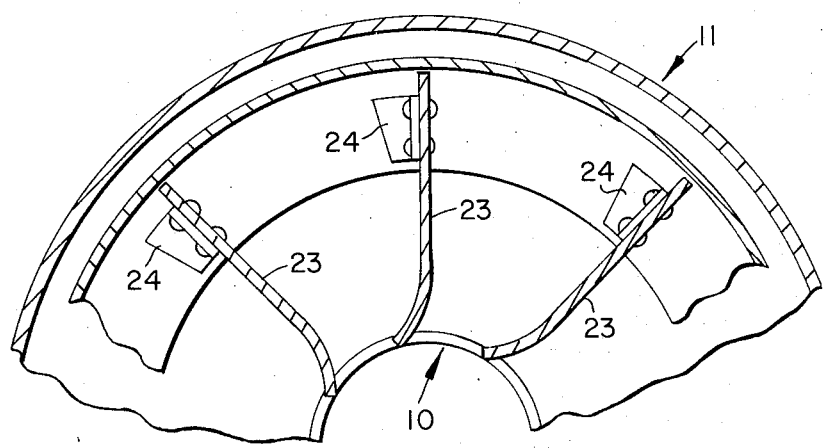
FIG. 2 is a sectional view taken along line 2—2 of FIG. 1.
Figure 3:
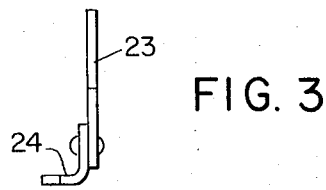
FIG. 3 is a side view showing a tab or vane extension for introducing, varying and controlling the pre-swirl affect to the fluid.
Figure 4:
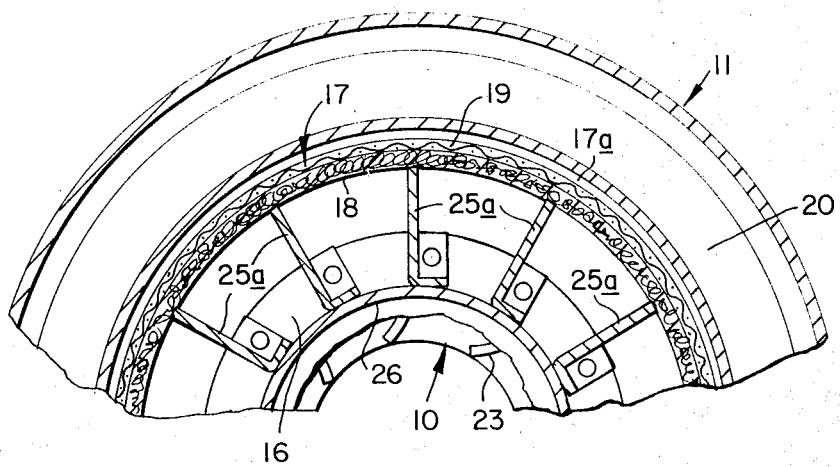
FIG. 4 is a sectional view taken along lines 4—4 of FIG. 1.

The compressor therefore serves two functions, it provides the positive air flow through the device as a whole, pulling polluted air from the atmosphere or from the source of pollution and it also whirls the air at a high circumferential velocity and thereby constitutes a centrifuge. As the result of the centrifugal action, all particles which have a mass large enough so that the centrifugal force exceeds the radially inward drag force on the particle are thrown out against the inner surface of the rotating cone 20. If the rotating cone 20 is not present, as is shown in the embodiment of FIG. 5 the material is thrown up against the inner wall of the housing. The particulate matter is then centrifuged outwardly and thereafter falls downwardly to the bottom of the apparatus and is collected through the port 21.

Air, still containing particles of small size, continues through the volume 30 and onto the rotating filter screen 19 and filter material 18. Depending upon the system pressure drop (and therefore power input into the system delivered by motor 9 which is allowable) the filter can be made nearly an absolute filter for any desired minimum particle size. If the particles are a liquid such as oil, they will be slowed in their passage through the filter and will agglomerate to a larger size. The increased mass of the larger sized particle agglomerates will become subject to the centrifugal force field and thrown outwardly and be collected in the same manner as the other particles.

The cleaned air passes into volume 31 and thence into the discharge vanes 25 comprising the expander or turbine. The discharge vane system is in reality a turbine; it should be understood that it can be an axial, radial inflow or a mixed flow type of turbine. The discharge radius and angle or the discharge vane system controls the overall energy imparted to the system.

In addition, the discharge vane system controls the flow rate of the fluid medium through the filter and the discharge passage 12 constitutes, as shown, a radial diffuser designed to recover the velocity energy (predominately rotational) left in the gas or fluid stream.

This recovered energy is utilized in the system to aid in driving the rotating components.

Reference should now be had to FIG. 5 which shown yet another slightly different embodiment of the invention. In this figure like numbers are used for like parts where possible.

In this construction, two filters rather than one are used. They are preferably in parallel. Thus, for a given fluid total quantity flow through the system, the double filter arrangement provides for a larger filter area, and hence a lower filter pressure drop. Conversely, the lower filter area could be used to accomodate larger quantity flows of fluid at the same pressure drop.

In this construction, two cylindrical filters, one within the other, are utilized for filtering the fluid medium fed into the apparatus. The filters are shown at 40 and 41 respectively. These filters are adapted to move together to rotate with the drive shaft 14.

In this configuration, the cone 20 has been removed from the outer wall of the housing 11 and is utilized in place of the inner deflecting wall of the cone 20. In addition, rotating guide means mounted on member 41 is provided at 42 for directing the flow of cleansed air out of the outlet 12. The member 42 is positioned above the expander vanes 25a and is connected to the top of the vanes. In this configuration, there is also provided pump 45, a reservoir 46 and a suitable piping 47 for directing fluid, (e.g. water) against the fluid (gas) being fed into the apparatus. In this manner it is also possible to remove (wash out) particles carried in the gas (air). Thus, the device becomes a scrubber as well as a dynamic filter.

It is to be understood that the pump 45, the reservoir 46 and the piping 47 can be removed and the filtration system would then operate in the same manner as described with reference to FIGS. 1 through 4. It should also be understood that the inner screen (17, 18,19) and cone (31) could be removed and the device would function as in FIGS. 1–4 but would also provide for scrubbing of the air. It should be observed that FIG. 5 has a radial inflow expander while FIG. 1 illustrates an axial expander.

It will thus be seen that the objects set forth above among those made apparent from the preceding description are efficiently attained since certain charges may be made in the above constructions without departing from the spirit and the scope of the invention. It is intended that all matter contained in the above description or shown in the accompanying drawings shall be interpreted as illustrative and not in a limiting sense. It is also to be understood that the following claims are intended to cover all generic and specific features of the invention herein described and all statements of the scope of the invention which as a matter of language might be said to fall therebetween.

I claim:

1. An apparatus for removing particulate matter from a fluid comprising a stationary housing, a rotatable cylindrical filter mounted on bearings within said housing, means for driving the filter, inlet means for providing fluid into the housing, compressor means positioned within the housing and between the inlet means and the rotatable filter and adapted to rotate with said filter to produce a positive flow of fluid into said housing between the inner wall of said housing and said filter, stationary outlet passage means extending from interior of the housing to the outside of said housing for permitting the fluid to leave said housing and turbine means positioned within the housing and between the filter and the stationary outlet passage means extending into the housing and adapted to rotate with said filter to extract excess energy of the filtered fluid after it has passed through the filter as well as to control the flow rate of the fluid medium and the pressure drop in the apparatus, said turbine discharging fluid into the stationary outlet passage means at a point interior of the housing, said compressor means and said turbine means comprising a plurality of vanes positioned about a shaft for rotating the vanes and the filter, the outlet passage means being located above the inlet means and the turbine vanes being located above the compressor vanes, the turbine vanes spaced inwardly a substantial distance from the outer periphery of the compressor vanes, and in which the turbine vanes are positioned below the outlet passage means.

2. An apparatus according to claim 1 in which means are provided as part of the compressor for introducing a controlled preswirl or counter-swirl into the fluid medium and particulate matter before it enters into the region of space between the inner wall of the housing and the filter.

3. An apparatus according to claim 1 in which a cone is positioned within the housing and is adapted to rotate with the filter, the outer cone wall providing means for deflecting fluid passing through said filter into said turbine means.

4. An apparatus according to claim 3 including a second cone adapted to rotate with said filter, said second cone positioned between the inner wall of the housing and the side of the filter positioned to first receive the fluid medium containing the particulate matter, said second cone having an inner wall positioned to deflect fluid medium into the filter.

5. An apparatus according to claim 1 in which means are provided for permitting the particulate matter to be discharged from the rotatable cylindrical filter into the stationary housing and means connected to the stationary housing to permit the particulate matter to exit from the housing so that the apparatus is self cleaning.

6. An apparatus for removing particulate matter from a fluid medium comprising in combination, a stationary housing, inlet means for the fluid, a shaft supported by the housing, a rotatable cylindrically shaped filter supported by the shaft and having a screen which is adapted to rotate within the housing, means for rotating the filter, compressor means positioned within the housing and between the inlet means and the filter for producing a positive first fluid medium flow and fluid medium swirl between the screen and the housing, stationary outlet passage means for fluid, expander means positioned within the housing and between the filter and the stationary outlet passage means for extracting energy remaining in the fluid medium after the fluid has passed through the screen, the compressor means and expander means both including a plurality of vanes arranged about the shaft, the outlet passage being located above the inlet passage and the expander vanes being located above the compressor vanes, and the expander vanes spaced inwardly a substantial distance from the outer periphery of the compressor vanes.

7. An apparatus according to claim 6 in which means are provided for forcing a second fluid flow into said housing to impinge upon the first fluid medium prior to the first fluid medium passing through said filter.

8. An apparatus according to claim 6 in which there is provided a second cylindrically shaped filter adapted to rotate with said first filter, one of said filters positioned within the other of said filters.

9. An apparatus according to claim 6 including common means for rotating the filter, compressor and expander means in unison.

10. An apparatus according to claim 6 in which the fluid enters the passage after leaving the expander at a point closer to the shaft than the point at which it is discharged from the passage thereby forming a radial diffuser to the velocity energy of the fluid.

* * * * *